April 4, 1944.  A. E. FREEMAN  2,345,929
CONDUCTOR LAYING MACHINE
Filed Dec. 6, 1940  2 Sheets-Sheet 1
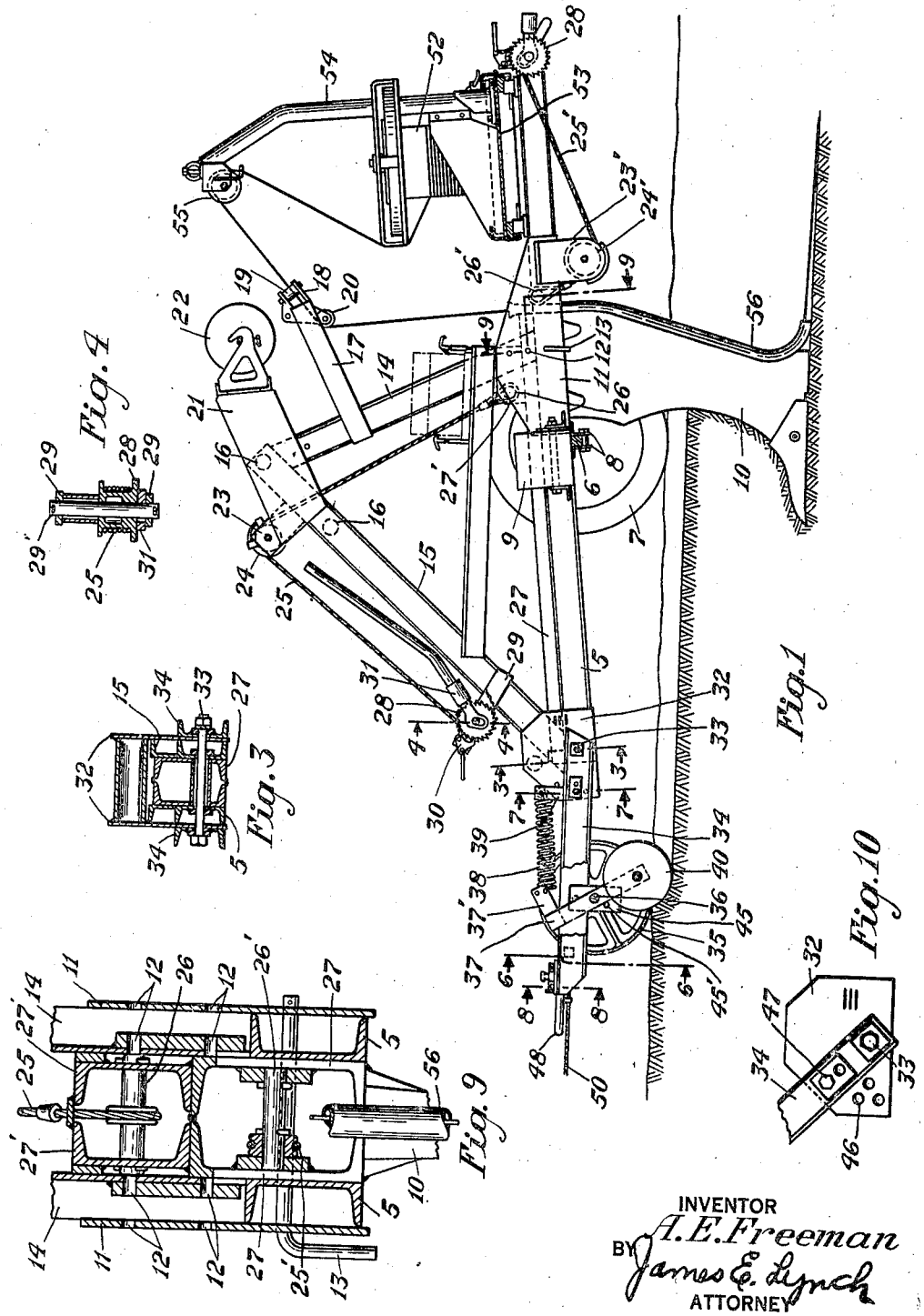
INVENTOR
A. E. Freeman
BY James E. Lynch
ATTORNEY April 4, 1944.  A. E. FREEMAN  2,345,929
CONDUCTOR LAYING MACHINE
Filed Dec. 6, 1940  2 Sheets-Sheet 2

INVENTOR
A. E. Freeman
BY James E. Lynch
ATTORNEY

Patented Apr. 4, 1944

2,345,929

UNITED STATES PATENT OFFICE 2,345,929

CONDUCTOR LAYING MACHINE

Albert Edward Freeman, South Orange, N. J., assignor to American Telephone and Telegraph Company, a corporation of New York Application December 6, 1940, Serial No. 368,807

3 Claims. (Cl. 97—82)

This invention relates to machines such as plows which are adapted to lay cables or wires beneath the surface of the ground.

It is an object of this invention to provide an arrangement of the above character which is capable of forming furrows or trenches in the ground and laying cables or wires therein as the machine advances.

In accordance with this invention a truck or tractor-drawn machine or plow is provided with a coulter for the preliminary opening of the ground in front of a plowshare. The plowshare is adjusted to enter the ground and form a trench therein of a desired depth. Reels of cable or wire are carried by the plow or may be carried by a towing truck or trailer, and the cable or wire from these reels is simultaneously fed through guide channels formed in the plowshare into the trench at the same rate of speed as the rate at which the plow advances.

The invention will be more fully understood from the following detailed description, when considered in connection with the accompanying drawings, in which one embodiment thereof is illustrated.

Referring to the drawings:

Figure 1 is a side elevation of the improved machine, showing the plowshare with its associated elements in operating positions.

Fig. 3 is a sectional view, taken on the line 3—3 of Fig. 1, showing the pivotal connection between the main plow frame, plowshare beam and the coulter frame.

Fig. 4 is a section, taken on the line 4—4 of Fig. 1, of a hand winch positioned on the front of the plow by which the plowshare is raised from the ground.

Fig. 9 is a section taken on the line 9—9 of Fig. 1 showing the manner in which the plowshare is attached to a pivoted plowshare beam which functions to adjust the plowshare to raised and lowered positions, and Fig. 10 is an elevational view showing gusset plates associated with the coulter and provided with openings through which a bolt is inserted to maintain the coulter in a desired adjusted position corresponding to the position in which the plowshare is held.

Figure 5:
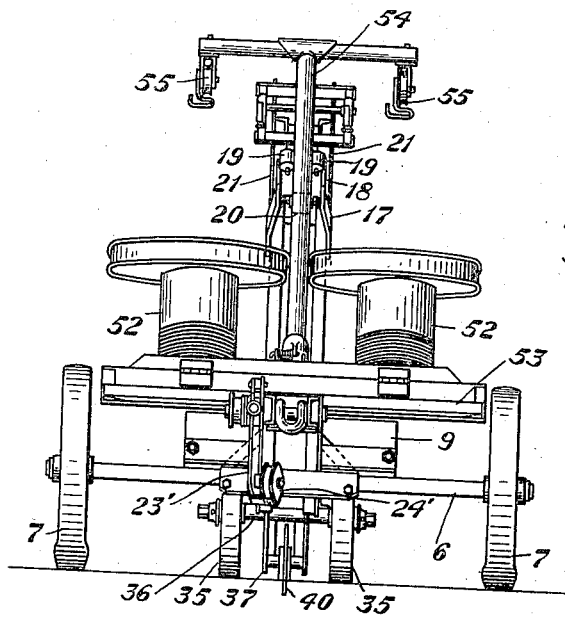
Fig. 5 is an end elevation of the improved device.
Figure 2:
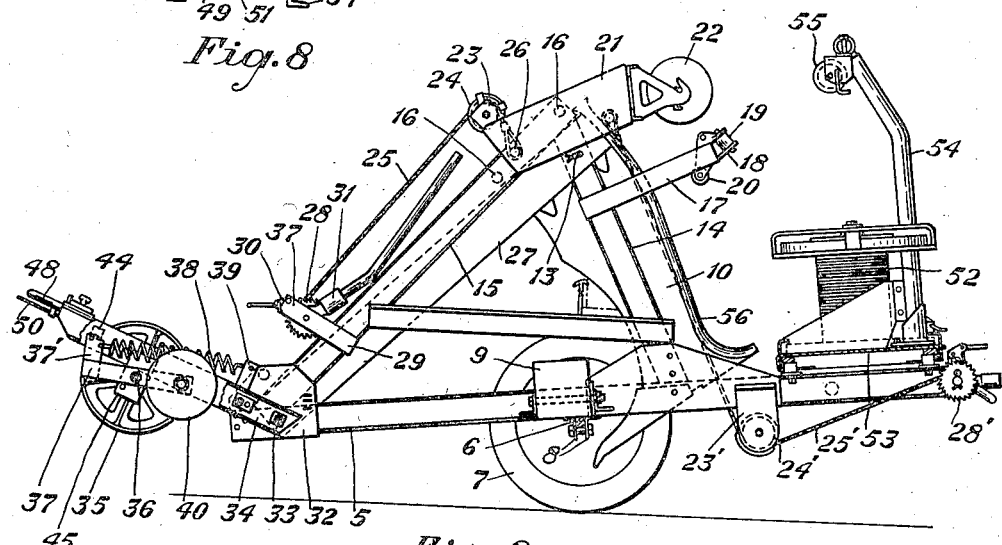
Fig. 2 is a view similar to Fig. 1, but with the various elements of the machine shown in carried or raised positions.

The machine is shown in the drawings as having a chassis including parallel longitudinally extending channel members 5. These members are carried on an axle 6 which is mounted upon suitable wheels 7, and a coulter frame supported on wheels extends forwardly of the chassis as will be presently described. The axle extends through a pair of angle clips 8 which are welded to the undersides of each of the channel members 5. Each of the channel members carries a weight 9, and these weights may be positioned between the angle irons secured to the members 5 as shown in Figs. 1, 2 and 5. These weights provide pressure to assist in the entrance and maintenance of a plowshare 10 in the ground. The plowshare includes a number of component portions, and the wearing parts may be readily replaced without replacing the whole plowshare. The plowshare is pivotally mounted between the channel members 5, 5 as will be later described in detail. A plate 11 is welded or otherwise secured to each of the outer sides of the channel members 5, 5, and corresponding openings 12 are provided through each of these plates 11 for the reception of a pin 13. This pin is shown in Fig. 2 in carried position, and in Figs. 1 and 9 in operating position, extending through the openings 12 to hold the plowshare 10 at a desired depth in the ground. Graduations are provided adjacent each of the openings to indicate the extent of these depths. The plowshare 10 will be set at a predetermined depth and this setting will correspond to that at which the coulter frame, to be later described, is also set. The setting of the plowshare and coulter frame in corresponding positions will cause the plowshare to form furrows parallel to the surface of the ground.

A supporting frame is carried on the channel members 5, 5 and consists of a pair of parallel channel members 14, 14 (Figs. 1, 2 and 9), which are positioned toward the rear of the chassis, and another pair of parallel channel members 15, 15 which are positioned toward the front of the chassis. These pairs of channel members lie in positions inclined toward each other, and the upper ends of the members 14, 14 abut like ends of the members 15, 15, as shown in Figs. 1 and 2. The members 14, 15 on each side of the chassis together with each of their associated longitudinal channel members 5 form a substantially triangular structure. Transversely extending rods or pipes 16, 16 pass between the channel members 15, 15 and serve as spacers therefor. Rearwardly extending supporting plates 17, 17 are carried on the channel members 14, 14 near their upper extremities, and brackets 18 are provided on the ends of said plates. These brackets carry a pair of parallel guide rollers 19, 19 and also an additional guide roller 20 which lies beneath the rollers 19, 19. The wire which is to be placed in the furrow formed by the plowshare, as it travels along the ground, passes through these guide rollers, as will be presently described. Another pair of supporting plates 21, 21 is carried on the upper ends of the channel members 14, 15 (Figs. 1 and 2) and provide brackets on which a reel 22 is mounted. This reel may carry a shield or other protective wire which is placed in the furrow simultaneously with the wire or conductor which passes through the guide rollers 19 and 20 just referred to. A pair of channel plates 23, 23 is welded or otherwise secured near the upper ends of the channel members 15, 15. The plates 23, 23 project forwardly from the channel members 15, 15 and a sheave 24 is journaled between said plates. A rope 25 passes over the sheave 24, and guards are provided over the sheave to maintain the rope in position. One end of the rope is secured to a thimble carried on a transverse pin 26 (Fig. 9) which is mounted in openings in the channel members 27', 27', and extends between the inner ends thereof. The channel members 27', 27' (Figs. 1, 2 and 9) are welded at the top of the plowshare beam channel members 27, 27. These members 27, 27 form the sides of the plowshare beam to be later described. The other end of the rope 25 is wound on the drum of a winch 28. This winch is carried on supporting plates 29, 29 which extend outwardly from flanges of the channel members 15, 15. Teeth are cut in the periphery of one of the flanges of the winch 28 which engage with a pawl 30, and this pawl may be placed in engaged and disengaged positions by a rod in the usual manner. The shaft 29' of the winch is journaled in the plates 29, 29 and a spacer is provided about the shaft and extends outwardly from the winch to the plate 29. The winch 28 is adapted to be operated by a lever socket wrench 31. This wrench has a tooth portion which engages the peripheral teeth on the flange of the winch 28, and it also has an elongated opening through which the winch shaft passes. This opening permits movement of the wrench on the shaft to engage or disengage the peripheral teeth. The operation of the winch lowers and raises the plowshare beam and its attached plowshare 10 in an obvious manner.

A second winch 28' is mounted on the rear of the channel members 5, 5 of the plow frame or chassis, and functions to assist in forcing the plowshare 10 into the ground after it has been lowered thereto by the front winch 28. The winch 28' is similar in construction to the winch 28 positioned at the front of the plow and just described. The shaft for the winch 28' is journaled between the channel members 5, 5 and is operated by a lever socket wrench in the same manner as previously described in connection with the front winch 28. A rope 25' passes from about the drum of the winch 28' and thence around a sheave 24', which is carried on a bracket 23' mounted on the channel members 5, 5. The other or free end of the rope 25' is secured to a thimble carried on a transverse pin 26', which extends between the channel members 27, 27 of the plowshare beam (Figs. 1 and 9). The winch 28' is shown in Fig. 1 in operating position or in position to aid in forcing the plowshare 10 into the ground. The pawl and ratchet mechanism of the winch 28' must first be released to permit the front winch 28 to operate and raise the plowshare beam. The pawl and ratchet mechanism of the front winch 28 has to be similarly released to permit the operation of the rear winch 28'.

Figure 6:
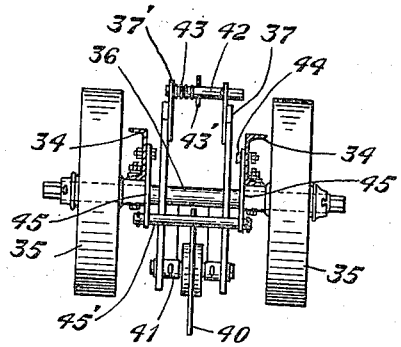
Fig. 6 is a sectional view of the coulter frame and associated elements taken on the line 6—6 of Fig. 1.
Figure 7:
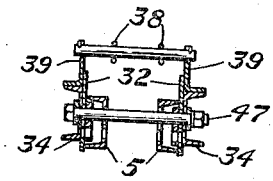
Fig. 7 is a section, taken on the line 7—7 of Fig. 1, showing mechanism by which the coulter frame is held in adjusted position.

A gusset plate 32 is attached to each of the channel members 5, 15—5, 15, and a spacer pipe extends between these plates (Fig. 3). A series of corresponding openings is provided through each of the gusset plates and a transversely extending bolt 33 (Fig. 3) passes through these openings and serves to provide a pivotal connection between the plow frame and the coulter frame. This bolt 33 also pivotally connects the channel members 27, 27 of the plowshare beam with the channel members 5, 5 of the chassis or plowshare frame. The coulter frame includes two parallel channel members 34, 34 carried on suitable wheels 35, 35 which are mounted on an axle 36 and the axle 36 carries two plate members 37, 37. Each of these plate members comprises an elongated portion which is attached at its midpoint to the axle 36, and beams 37', 37' extending at right angles from the top of these elongated portions provide an anchorage for the ends of the springs 38. The other ends of these springs are anchored to a transverse rod which extends between the angle clip members 39 mounted on the channel members 34 (Figs. 1 and 7). The lower ends of the elongated portions 37 have a shaft which carries a coulter blade 40. A circular flange portion is provided on each side of the coulter blade 40, and these flanges abut bosses 41 carried on the inner surfaces of the elongated portions 37. The flanges and bosses provide spacers between the elements (Fig. 6).

When it is desired to adjust the coulter blade 40 to a carried position, the following operations are performed:

A wrench is applied to a nut on an end of the axle 36. The nuts are welded on the axle and when they are rotated the axle is rotated. The plates 37, 37 which are also welded or fixed on the axle 36, and under spring pressure, are rotated at this time until the rod 42 is near a stop 44, which stop is mounted on one of the channel members 34. To permit the rod 42 to pass the stop 44, the rod 42 must be pushed laterally or to the left as seen in Fig. 6. The rod 42 fits in openings in the beam 37' which extends at right angles to the elongated plates 37, 37 and the spring 43, which encircles the rod, extends to a pin 43' which passes through the rod 42. A cotter pin or the like holds the rod 42 under pressure and in lateral displaced position in the openings of the beam members 37', 37'. The pin 43' is manually pushed to the left until the end of rod 42 lies flush or slightly inside of the plate 37 which is positioned at the right, as shown in Fig. 6. When the rod 42 has passed the stop 44, the rod is released, permitting it to be set against said stop. After the above operations have been performed, the coulter blade is clear of the ground.

At this time the coulter frame with its wheels 35, 35 and associated equipment may be raised to a carried position in the following manner: The bolt 33, which provides a pivotal connection between the plow frame and the coulter frame, as previously described, permits the coulter frame to be swung in an upward direction until the openings in the channel members of the coulter frame coincide with the openings 46 in the gusset plate 32. A bolt 47 is introduced through these openings when the coulter frame is in the desired raised position (Figs. 2, 7 and 10).

When it is desired to lower the coulter frame from its carried position to an operating position, or in a position to form a furrow in the ground, reverse operations to those just described are performed. These operations are as follows: The bolt 47 is removed from its position through the openings 46, thus causing the coulter frame, which is pivotally connected at 33, to collapse, so that the coulter wheels lie on the ground. The axle 36 which carries plates 37, 37 and also pin 42, is rotated by a wrench, and is moved slightly at the start to relieve the pressure of the pin 42 against the stop 44. The pin 42 is pushed to the left manually until the end of said pin is flush or slightly inside of the plate 37 (which is positioned at the right in Fig. 6) to permit pin 42 to pass the stop 44. The further rotation of the axle will cause the plates, 37, 37, which are under spring pressure, to be brought against the stop 45'. This stop 45' comprises a transversely extending rod which is mounted in the parallel plates 45, fixed on the inside of the channel members 34, 34 of the coulter frame (Figs. 1 and 6). This stop 45' permits the plates 37, 37 which carry the coulter blade 40, to be held in a desired operating position in the ground.

Figure 8:
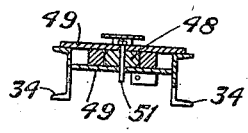
Fig. 8 is a section taken on the line 8—8 of Fig. 1, showing a towing hook or eye and a bolt by which the hook is coupled to the coulter frame.

A towing eye 48 is carried at the forward end of the coulter frame and lies between guides carried by a pair of horizontally positioned plates 49 attached to the channel members 34, 34 (Fig. 8). A towing rope 50 is attached to a rectangular block lying under the towing eye, and this rope is used when the machine is in plowing operation. A shear pin 51 passes between the plates 49 and the towing eye 48. This pin becomes sheared off when the plowshare encounters any excessive strain or solid obstructions in the ground which may be met in the course of plowing operations, thus releasing the towing eye from the coulter frame. Damage to the plowshare or frame is thus overcome.

The wire or other conductor which is to be fed into the trench or furrow in the ground is supplied from reels 52. These reels are positioned on suitable bases or platforms 53. These platforms and associated structure may be similar in design to the apparatus described and disclosed in Patent No. 2,184,912, dated December 26, 1939. The platform 53 is mounted at the rear of the chassis or plow frame and overhangs the sides of the channel members. The reels 52 have an upright 54 associated therewith, and this upright is mounted on the same platform as the reels. The upright may have a cross-arm at the ends of which sheaves 55, 55 are mounted.

The wire or other conductor carried by the reels may be drawn therefrom simultaneously and passes over the sheaves 55, 55 between the roller guides 19, over sheave 20 and enters a wire-guide tube 56. The tube 56 is integral with and lies at the rear edge of the plowshare 10. The upper or receiving end of the tube 56 is flared, and the other or exit end of this tube lies substantially in alinement with the bottom of the furrow formed by the plowshare so that as the wire or conductors emerge from the tube they will be laid in the furrow in accordance with the advance of the plow. The shield wire carried on the reel 22 may be also laid at the same time, and this serves to protect conductors from electrical disturbances.

In the operation of the present arrangement the required number of conductors from the reels 52 and the shield wire from the reel 22 are threaded through the tube 56. The lock pin 13 which holds the plowshare in its trailing position is removed, and the plowshare is lowered to the ground by means of the front end winch 28. The coulter frame is now lowered from a carried position to an operating position by the operations previously described in this connection.

The plowing machine may be now connected to a truck or other tractor by means of the towing rope 50, one end of which is connected to the shear pin 51 and the other end is connected to the truck. As the truck is started and tension is taken in the towing rope, the point of the plowshare 10 will start into the ground. As the plow moves forward the winch 28' at the rear of the plow is operated to assist the plowshare into the ground. As the machine advances, a furrow is formed by the plowshare at a depth determined by its setting, and wire or other conductors passing through the guide tube from the reels, is automatically fed into the formed furrow in accordance with the advance of the machine.

The plow frame may be shifted on its axle by loosening the clamp bolts about the axle and exerting pressure sidewise on the wheels to permit plowing close to obstructions such as rail fences, mail boxes or the like.

The plowshare and coulter may be raised from their operating positions to their carried positions in a manner previously outlined.

While the arrangements of this invention have been illustrated as embodied in certain specific forms which have been deemed desirable, it will be understood that they are capable of embodiment in many and widely varied forms without departing from the spirit of the invention as defined in the appended claims.

What is claimed is:

1. An apparatus for forming furrows, including a frame, a plow beam pivotally mounted on said frame and being provided with a plowshare, a coulter frame pivotally connected to said plow frame at the pivot point of said plow beam, a coulter blade, supporting means for said blade pivotally associated with said coulter frame, means for adjusting said plow beam to cause said plowshare to plow at selected depths, means for adjusting the height of said first mentioned pivot point to position the bottom of said plowshare at a desired angle with respect to the ground line at selected plowing depths, and spring means associated with said blade supporting means and tending to exert a rotary force thereon to automatically maintain said blade at a selected cutting depth regardless of the depth of plowing.

2. An apparatus for forming furrows including a frame, a plow beam pivotally mounted on said frame and being provided with a plowshare, a coulter frame pivotally connected to said plow frame at the pivot point of said plow beam, wheels for supporting said coulter frame, a coulter blade, supporting means for said blade pivotally associated with said coulter frame at a point in proximity to the supporting point of said wheels, means for adjusting said plow beam to cause said plowshare to plow at selected depths, means for adjusting the height of said first-mentioned pivot point to position the bottom of said plowshare parallel to the ground line at selected plowing depths, and spring means associated with said blade supporting means and operative to exert a force tending to impart a rotary motion thereto for automatically maintaining said blade at a selected cutting depth regardless of the depth of plowing.

3. An apparatus for forming furrows, including a plow frame, wheels for supporting said frame, a plow beam pivotally mounted on said frame near the front end thereof, a plowshare connected to said beam near the rear end thereof, a coulter frame pivotally connected near its rear end to said plow frame at the pivot point of said beam, wheels for supporting said coulter frame, a coulter blade, supporting means for said blade pivoted to the coulter wheel axle, said blade being so positioned that its axis is to the rear of the pivot point of said supporting means, means for adjusting said plowshare for selected plowing depths, means for adjusting the height of said first-mentioned pivot point to position the bottom of said plowshare parallel to the ground line at selected plowing depths, and spring means associated with said blade supporting means and operative automatically upon the adjustment of the height of said first-mentioned pivot point and upon the resultant change in the angular position of said coulter and plow frames to maintain said coulter blade at a selected cutting depth regardless of the depth of plowing.

ALBERT EDWARD FREEMAN.